United States Patent
Qiao et al.

(10) Patent No.: US 10,082,890 B2
(45) Date of Patent: Sep. 25, 2018

(54) ELECTROSTATIC COMMUNICATION USING AN ACTIVE STYLUS

(71) Applicant: Microsoft Technology Licensing, LLC, Redmond, WA (US)

(72) Inventors: Tianzhu Qiao, Portland, OR (US); Jonathan Westhues, Portland, OR (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 311 days.

(21) Appl. No.: 14/842,225

(22) Filed: Sep. 1, 2015

(65) Prior Publication Data
US 2017/0060276 A1    Mar. 2, 2017

(51) Int. Cl.
G06F 3/0354   (2013.01)
G06F 3/046    (2006.01)
G06F 3/038    (2013.01)
G06F 3/041    (2006.01)

(52) U.S. Cl.
CPC ........ *G06F 3/03545* (2013.01); *G06F 3/0383* (2013.01); *G06F 3/046* (2013.01); *G06F 3/0416* (2013.01)

(58) Field of Classification Search
USPC ........................................... 345/179
See application file for complete search history.

(56) References Cited

U.S. PATENT DOCUMENTS

| | | | |
|---|---|---|---|
| 6,081,259 A | 6/2000 | Teterwak | |
| 6,133,906 A | 10/2000 | Geaghan | |
| 7,372,455 B2 | 5/2008 | Perski et al. | |
| 8,278,571 B2 | 10/2012 | Orsley | |
| 2010/0053113 A1 | 3/2010 | Wu et al. | |
| 2012/0050231 A1 | 3/2012 | Westhues et al. | |
| 2012/0105362 A1 | 5/2012 | Kremin et al. | |
| 2013/0106722 A1 | 5/2013 | Shahparnia et al. | |
| 2013/0169601 A1 | 7/2013 | Mo et al. | |
| 2013/0207938 A1 | 8/2013 | Ryshtun et al. | |
| 2013/0278550 A1 | 10/2013 | Westhues | |
| 2014/0078105 A1 | 3/2014 | Son | |
| 2014/0240298 A1 | 8/2014 | Stern | |
| 2014/0247238 A1 | 9/2014 | Chang | |
| 2015/0116271 A1 | 4/2015 | Shahparnia et al. | |

(Continued)

FOREIGN PATENT DOCUMENTS

WO    2012057887 A1    5/2012

OTHER PUBLICATIONS

ISA European Patent Office, International Search Report and Written Opinion Issued in Application No. PCT/US2016/044949, dated Oct. 10, 2016, WIPO, 11 Pages.

(Continued)

*Primary Examiner* — Jason C Olson
(74) *Attorney, Agent, or Firm* — Alleman Hall Creasman & Tuttle LLP (57) ABSTRACT

An active stylus includes an electrode and a controller. The controller is configured to 1) generate a report including stylus information represented by a plurality of bits including a first subset of bits and a second subset of bits, 2) encode the first set of bits differently than the second set of bits to reduce a size of the report, and 3) excite the electrode with a carrier signal to form an electrostatic communication channel, the carrier signal being modulated to transmit the report via the electrostatic communication channel.

20 Claims, 7 Drawing Sheets

(56) References Cited

U.S. PATENT DOCUMENTS

2015/0193033 A1 7/2015 Westhues
2015/0346875 A1* 12/2015 Yeh .................... G06F 3/03545
 345/174
2016/0266663 A1* 9/2016 Holsen ................ G06F 3/03545

OTHER PUBLICATIONS

"International Preliminary Report on Patentability Issued in PCT Application No. PCT/US2016/044949", dated Sep. 18, 2017, 7 Pages.
IPEA European Patent Office, Second Written Opinion Issued in PCT Application No. PCT/US2016/044949, dated Jul. 14, 2017, WIPO, 6 Pages.
Lee, et al., "Haptic Pen: A Tactile Feedback Stylus for Touch Screens", In Proceedings of the 17th annual ACM symposium on User interface Software and Technology, Oct. 24, 2004, pp. 291-294.

* cited by examiner

ELECTROSTATIC COMMUNICATION USING AN ACTIVE STYLUS

BACKGROUND

Touch-sensitive display devices allow a user to interact with objects displayed on the device via touch input. While a user's finger may be the most convenient means of interacting with a touch-sensitive display device, a finger may not be the most accurate or precise means of targeting display objects. An active stylus may thus be utilized to increase the quality of a user's interactive experience by providing greater touch input precision than a user's finger, for example. Active styluses may also allow for different types of interaction.

DETAILED DESCRIPTION

An active stylus and a display device may be configured to establish and maintain a shared sense of time to facilitate interaction (touch sensing, position sensing, data transmission, etc.). Such interaction may occur over successive repeatedly-occurring time frames, also referred to as touch-sensing frames of a touch-sensing sequence or routine. Touch-sensing frames may be divided into a plurality of subframes that are designated for performing different operations. For example, a stylus-drive subframe may be designated for the active stylus to transmit stylus information to the display device via an electrostatic communication channel formed between an electrically-stimulated electrode of the active stylus and a touch sensor of the display device. A duration of the touch-sensing frame, and correspondingly a duration of the stylus-drive subframe, may be limited in order to inhibit a touch-input response as being perceived by a user as lagging. Moreover, the electrostatic communication channel may have limited transmission bandwidth in which stylus information may be transmitted to the display device.

Accordingly, the present disclosure relates to various approaches for transmitting a report that includes the stylus information in an efficient and robust manner such that data transmission via the electrostatic communication channel may be reduced. More particularly, the present disclosure relates to performing various operations to reduce a size of the report. By reducing the size of the report, time within the stylus-drive subframe may be reduced and/or freed up for other purposes.

Furthermore, in some implementations, various operations may be performed on the report to make transmission of the report more robust (e.g., less prone to transmission error). Such operations can reduce the likelihood of the report having to be re-sent due to errors or data corruption. In other words, such operations may reduce data transmission via the electrostatic communication channel.

Figure 1:
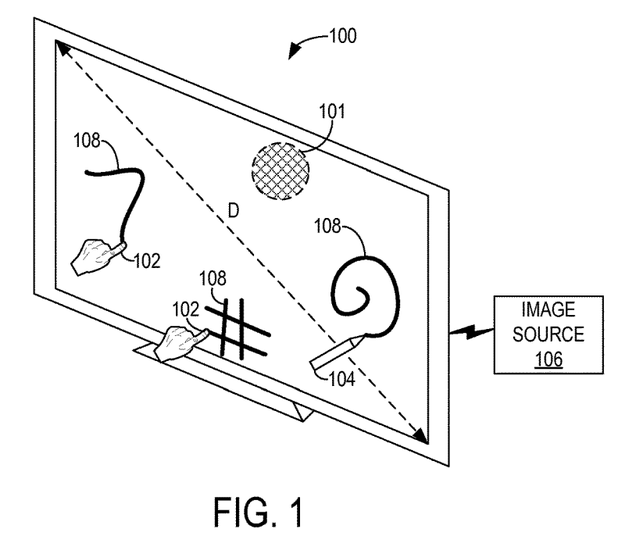
FIG. 1 shows an example touch-sensitive display device.

FIG. 1 shows a touch sensitive display device 100 including a touch sensor 101. In some examples, display device 100 may be a large-format display device with a diagonal dimension D greater than 1 meter, for example, though the display may assume any suitable size. Display device 100 may be configured to sense one or more sources of input, such as touch input imparted via a digit 102 of a user and/or input supplied by an input device 104, shown in FIG. 1 as a stylus. Digit 102 and input device 104 are provided as non-limiting examples and any other suitable source of input may be used in connection with display device 100. Further, display device 100 may be configured to receive input from input devices in contact with the display device 100 and input devices not in contact with the display device 100 (e.g., input devices that hover proximate to a surface of the display). "Touch input" as used herein refers to both types of input. In some examples, display device 100 may be configured to receive input from two or more sources simultaneously, in which case the display device may be referred to as a multi-touch display device.

Display device 100 may be operatively coupled to an image source 106, which may be, for example, a computing device external to, or housed within, the display device 100. Image source 106 may receive input from display device 100, process the input, and in response generate appropriate graphical output 108 for the display device 100. In this way, display device 100 may provide a natural paradigm for interacting with a computing device that can respond appropriately to touch input. Details regarding an example computing device are described below with reference to FIG. 13.

Figure 2:
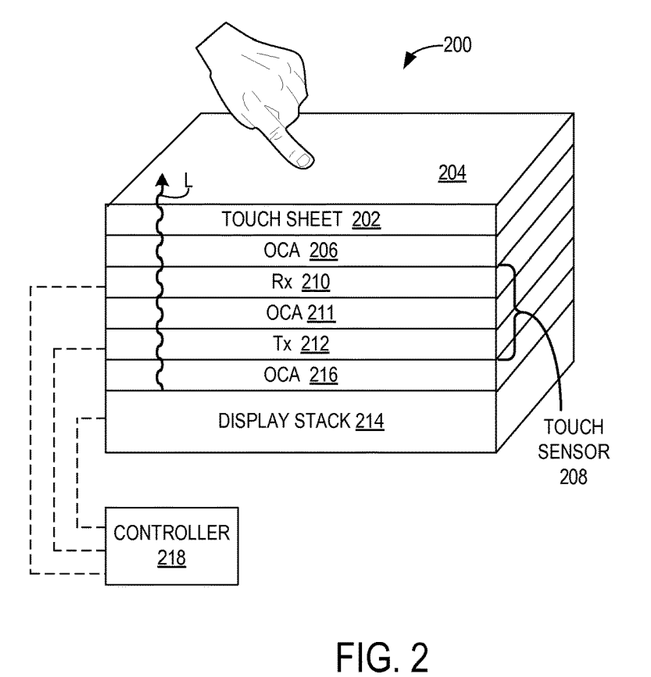
FIG. 2 shows an optical stack and associated subsystems of the touch-sensitive display device of FIG. 1.

FIG. 2 is a cross-sectional view of an optical stack 200 of display device 100 of FIG. 1. Optical stack 200 includes a plurality of components configured to enable the reception of touch input and the generation of graphical output. Optical stack 200 may include an optically-clear touch sheet 202 having a top surface 204 for receiving touch input, and an optically-clear adhesive (OCA) 206 bonding a bottom surface of the touch sheet 202 to a top surface of a touch sensor 208, which may correspond to touch sensor 101 of FIG. 1, for example. Touch sheet 202 may be comprised of any suitable material(s), such as glass, plastic, or another material. As used herein, "optically-clear adhesive" refers to a class of adhesives that transmit substantially all (e.g., about 99%) of incident visible light.

As described in further detail below with reference to FIG. 3, touch sensor 208 includes a matrix of electrodes that form capacitors whose capacitances may be evaluated in detecting touch input. As shown in FIG. 2, the electrodes may be formed in two separate layers: a receive electrode layer (Rx) 210 and a transmit electrode layer (Tx) 212 positioned below the receive electrode layer. For example, receive and transmit electrode layers 210 and 212 each may be formed on a respective dielectric substrate comprising materials including but not limited to glass, polyethylene terephthalate (PET), or cyclic olefin polymer (COP) film. Receive and transmit electrode layers 210 and 212 may be bonded together by a second optically-clear adhesive (OCA) 211. OCA 211 may be an acrylic pressure-sensitive adhesive film, for example.

The touch sensor configuration illustrated in FIG. 2 is provided as an example, and other arrangements are within the scope of this disclosure. For example, in other implementations, layers 210, 211, and 212 may be integrally formed as a single layer with electrodes disposed on opposite surfaces of the integral layer. Further, touch sensor 208 may alternatively be configured such that transmit electrode layer 212 is provided above, and bonded, via OCA 211, to receive electrode layer 210 positioned therebelow.

Receive and transmit electrode layers 210 and 212 may be formed by a variety of suitable processes. Such processes may include deposition of metallic wires onto the surface of an adhesive, dielectric substrate; patterned deposition of a material that selectively catalyzes the subsequent deposition of a metal film (e.g., via plating); photoetching; patterned deposition of a conductive ink (e.g., via inkjet, offset, relief, or intaglio printing); filling grooves in a dielectric substrate with conductive ink; selective optical exposure (e.g., through a mask or via laser writing) of an electrically conductive photoresist followed by chemical development to remove unexposed photoresist; and selective optical exposure of a silver halide emulsion followed by chemical development of the latent image to metallic silver, in turn followed by chemical fixing. In one example, metalized sensor films may be disposed on a user-facing side of a substrate, with the metal facing away from the user or alternatively facing toward the user with a protective sheet (e.g., comprised of PET) between the user and metal. Although transparent conducting oxide (TCO) is typically not used in the electrodes, partial use of TCO to form a portion of the electrodes with other portions being formed of metal is possible. In one example, the electrodes may be thin metal of substantially constant cross section, and may be sized such that they may not be optically resolved and may thus be unobtrusive as seen from a perspective of a user. Suitable materials from which electrodes may be formed include various suitable metals (e.g., aluminum, copper, nickel, silver, gold), metallic alloys, conductive allotropes of carbon (e.g., graphite, fullerenes, amorphous carbon), conductive polymers, and conductive inks (e.g., made conductive via the addition of metal or carbon particles).

Continuing with FIG. 2, touch sensor 208 is bonded, at a bottom surface of transmit electrode layer 212, to a display stack 214 via a third optically-clear adhesive (OCA) 216. Display stack 214 may be a liquid crystal display (LCD) stack, organic light-emitting diode (OLED) stack, or plasma display panel (PDP), for example. Display stack 214 is configured to emit light L through a top surface of the display stack, such that emitted light travels in a light emitting direction through layers 216, 212, 211, 210, 206, touch sheet 202, and out through top surface 204. In this way, emitted light may appear to a user as an image displayed on top surface 204 of touch sheet 202.

Further variations to optical stack 200 are possible. For example, implementations are possible in which layers 211 and/or 216 are omitted. In this example, touch sensor 208 may be air-gapped and optically uncoupled to display stack 214. Further, layers 210 and 212 may be laminated on top surface 204. Still further, layer 210 may be disposed on top surface 204 while layer 212 may be disposed opposite and below top surface 204.

FIG. 2 also shows a controller 218 operatively coupled to receive electrode layer 210, transmit electrode layer 212, and display stack 214. Controller 218 is configured to drive transmit electrodes in transmit electrode layer 212, receive signals resulting from driven transmit electrodes via receive electrodes in receive electrode layer 210, and locate, if detected, touch input imparted to optical stack 200. Controller 218 may further drive display stack 214 to enable graphical output responsive to touch input. Two or more controllers may alternatively be provided, and in some examples, respective controllers may be implemented for each of receive electrode layer 210, transmit electrode layer 212, and display stack 214. In some implementations, controller 218 may be implemented in image source 106 of FIG. 1.

Figure 3:
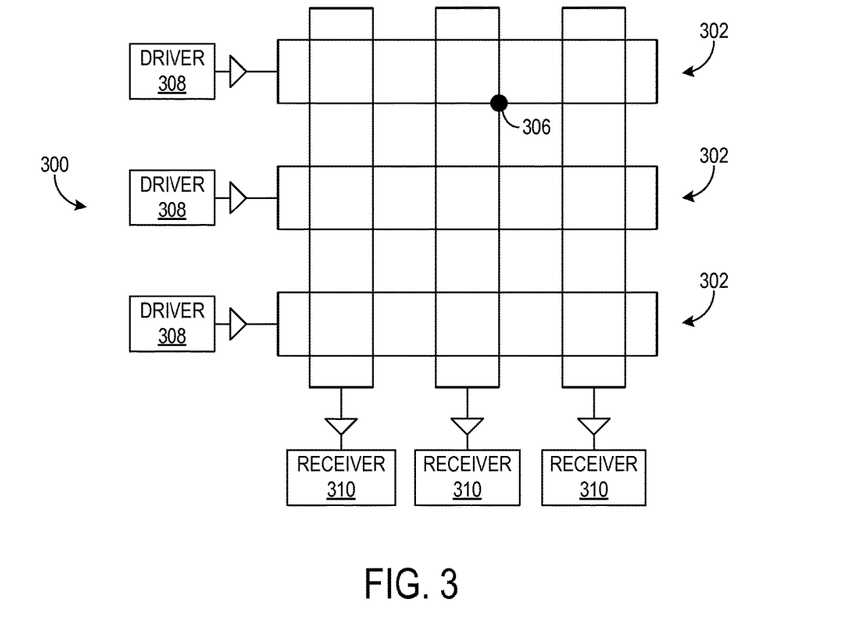
FIG. 3 shows an example touch sensor matrix of the touch-sensitive display device of FIG. 1.

FIG. 3 shows an example touch sensor matrix 300. Matrix 300 may be included in touch sensor 208 of optical stack 200 of FIG. 2 to bestow touch sensing functionality to display device 100 of FIG. 1, for example. Matrix 300 includes a plurality of electrodes in the form of transmit rows 302 vertically separated from receive columns 304. Transmit rows 302 and receive columns 304 may be respectively formed in transmit electrode layer 212 and receive electrode layer 210 of optical stack 200, for example. Each vertical intersection of transmit rows 302 with receive columns 304 forms a corresponding node such as node 306 whose electrical properties (e.g., capacitance) may be measured to detect touch input. Three transmit rows 302 and three receive columns 304 are shown in FIG. 3 for the purpose of clarity, though matrix 300 may include any suitable number of transmit rows and receive columns, which may be on the order of one hundred or one thousand, for example.

While a rectangular grid arrangement is shown in FIG. 3, matrix 300 may assume other geometric arrangements—for example, the matrix may be arranged in a diamond pattern. Alternatively or additionally, individual electrodes in matrix 300 may assume nonlinear geometries—e.g., electrodes may exhibit curved or zigzag geometries, which may minimize the perceptibility of display artifacts (e.g., aliasing, moiré patterns) caused by occlusion of an underlying display by the electrodes. The transmit rows 302 and receive columns 304 may be positioned/oriented according to any suitable layout. For example, transmit rows 302 may be oriented horizontally with respect to ground, vertically with respect to ground, or at another angle. Likewise, receive columns 304 may be oriented horizontally with respect to ground, vertically with respect to ground, or at another angle.

Each transmit row 302 in matrix 300 may be coupled to a respective driver 308 configured to drive its corresponding transmit row with a time-varying voltage. In some implementations, drivers 308 of matrix 300 may be driven by a microcoded state machine implemented within a field-programmable gate array (FPGA) forming part of controller 218 of FIG. 2, for example. Each driver 308 may be implemented as a shift register having one flip-flop and output for its corresponding transmit row, and may be operable to force all output values to zero, independently of register state. The inputs to each shift register may be a clock, data input, and a blanking input, which may be driven by outputs from the microcoded state machine. Signals may be transmitted by filling the shift register with ones on every output to be excited, and zeroes elsewhere, and then toggling the blanking input with a desired modulation. Such signals are referred to herein as "excitation sequences", as these signals may be time-varying voltages that, when digitally sampled, comprise a sequence of pulses—e.g., one or more samples of a relatively higher digital value followed by one or more samples of a relatively lower digital value, or vice versa. If the shift register is used in this fashion, excitation sequences may take on only two digital values—e.g., only binary excitation sequences can be transmitted. In other implementations, drivers 308 may be configured to transmit non-binary excitation sequences that can assume three or more digital values. Non-binary excitation sequences may enable a reduction in the harmonic content of driver output and decrease the emissions radiated by matrix 300.

Figure 4:
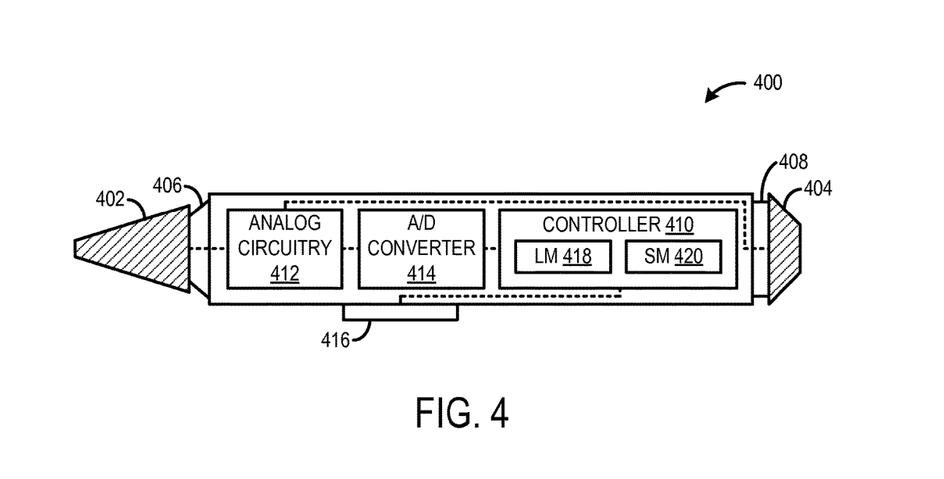
FIG. 4 shows an example active stylus that may be used with the touch-sensitive display device of FIG. 1.

In some implementations, matrix 300 may be configured to communicate with an active stylus, such as active stylus 400 shown in FIG. 4. This implementation may at least partially enable touch sensitive display device 100 to communicate with input device 104 when matrix 300 is implemented in display device 100. Specifically, an electrostatic channel may be established between one or more transmit rows 302 and a conductive element (e.g., electrode tip) of active stylus 400, along which data may be transmitted. In one example, communication via the electrostatic channel is initiated by the transmission of a synchronization pattern from matrix 300 to active stylus 400. The synchronization pattern may enable matrix 300 and active stylus 400 to obtain a shared sense of time, and may be transmitted via multiple transmit rows 302 so that active stylus 400 can receive the pattern regardless of its position relative to the matrix. The shared sense of time may facilitate the correlation of a time at which active stylus 400 detects an excitation sequence or other signal transmitted on transmit rows 302 to a location in matrix 300, as the synchronization pattern may yield an indication of the order in which transmit rows 302 are driven. Such correlation may enable active stylus 400 to determine at least one coordinate (e.g., y-coordinate) relative to matrix 300, which may be transmitted back to the matrix (e.g., via the electrostatic channel) or to an associated display device via a different communication protocol (e.g., radio, Bluetooth). To determine a second coordinate (e.g., x-coordinate) of active stylus 400, all transmit rows 302 may be held at a constant voltage, and active stylus 400 may transmit a time-varying voltage to matrix 300, which may sequentially measure currents resulting from a voltage of active stylus 400 in each receive column 304 to ascertain the second coordinate.

Each receive column 304 in matrix 300 may be coupled to a respective receiver 310 configured to analyze received signals resulting from the transmission of excitation sequences on transmit rows 302. During touch detection, matrix 300 may hold all transmit rows 302 at a constant voltage except for an active transmit row along which an excitation sequence is transmitted. During transmission of the excitation sequence, all receive columns 304 may be held at a constant voltage (e.g., ground). With the excitation sequence applied to the active transmit row 302 and all receive columns 304 held at the constant voltage, a current may flow through each of the nodes formed by the vertical intersections of the active transmit row with the receive columns. Each current may be proportional to the capacitance of its corresponding node. Hence, the capacitance of each node may be measured by measuring each current flowing from the active transmit row 302. In this way, touch input may be detected by measuring node capacitance. Matrix 300 may be repeatedly scanned at a frame rate (e.g., 60 Hz, 120 Hz) to persistently detect touch input, where a complete scan of a frame comprises applying an excitation sequence to each transmit row 302, and for each driven transmit row, collecting output from all of the receive columns 304. However, in other examples, a complete scan of a frame may be a scan of a desired subset, and not all, of one or both of transmit rows 302 and receive columns 304.

Other measurements may be performed on matrix 300 to detect touch, alternatively or additionally to the measurement of capacitance—for example, a time delay between the transmission of an excitation sequence and reception of a received signal resulting from the transmitted excitation sequence, and/or a phase shift between the transmitted excitation sequence and the resulting received signal may be measured.

The above described touch sensor matrix is provided as an example, and is meant to be non-limiting. Other touch sensor configurations may be employed without departing from the scope of the present disclosure.

FIG. 4 shows an example active stylus 400. Active stylus 400 includes an electrode tip 402 on one end and an electrode eraser 404 on an opposing end. The electrode tip 402 and the electrode eraser 404 may be electrically conductive and configured to receive current when proximate to a driven electrode of electrode matrix 300 of FIG. 3. Tip 402 may include a pressure sensor 406 configured to detect a pressure when tip 402 is pressed against a surface. Likewise, eraser 404 may include a pressure sensor 408 configured to detect a pressure when eraser 404 is pressed against a surface. In one example, each of pressure sensors 406 and 408 are force sensitive resistors. A touch pressure value of each of the respective pressure sensors 406 and 408 may be sent to a controller 410. In one example, the touch pressure value may be represented by a 6 bit value.

As shown, electrode tip 402 and electrode eraser 404 are operatively coupled to analog circuitry 412. Analog circuitry 412 may include linear analog componentry configured to maintain the tip/eraser at a constant voltage and convert any current into or out of the tip/eraser into a proportional current-sense voltage.

An analog-to-digital (A/D) converter 414 is operatively coupled to analog circuitry 412 and configured to digitize voltages received from analog circuitry 412 into digital data to facilitate subsequent processing. As a non-limiting example, converter 414 may convert incoming electrostatic signals having bandwidths of 100 kHz at a sampling rate of 1 Mbit/s.

Active stylus 400 includes a barrel switch button 416 that may be depressable by a user to provide additional user input. A state of button 416 may be sent to controller 410.

The controller 410 includes a logic machine 418 and a storage machine 420 configured to hold instructions executable by logic machine 418 to perform various operations discussed herein. For example, controller 410 may be configured to receive signals from various sensors including pressure sensor 406, pressure sensor 408, and button 416. Further, controller 410 may be configured to process digitized signals from A/D converter 414 to perform other operations discussed herein.

Active stylus 400 may operate in a receive mode and a drive mode. Receive mode may be employed (1) to synchronize active stylus 400 to the computing device/processor associated with the touch-sensor, to establish/maintain a shared sense of time; and (2) to establish the Y coordinate of active stylus 400 with respect to the touch-sensor matrix (or the X coordinate in the event of vertically-oriented rows). Synchronization typically occurs at the beginning of the time frame, in which one or more rows on the touch-sensor matrix are driven with a synchronization pulse that induce/vary electrical conditions on electrode tip 402 (or electrode eraser 404) of active stylus 400. The received signal is processed, typically via a correlation operation, in order to establish/maintain the shared sense of timing. Usually, multiple rows, spanning the entire height/width of the touch-sensor matrix, are driven with the synchronization pulse so that active stylus 400 receives an adequate signal regardless of its position relative to touch-sensor matrix 300.

Active stylus 400 may also operate in a receive mode during normal scanning of the rows of touch-sensor matrix 300. In other words, active stylus 400 may receive signals while the rows are scanned to establish the X and Y coordinates of finger hover/touch on touch-sensor matrix 300. The receive circuitry typically runs a correlation operation that is tuned to the drive signal(s) being used on touch-sensor matrix 300. Upon receiving a signal of greatest amplitude (e.g., highest correlation), active stylus 400 makes a note of the timing of that highest signal. The recorded timing allows active stylus 400 and display device 100 of touch-sensor matrix 300 to know which row active stylus 400 was closest to, thereby establishing the Y position of active stylus 400. In some examples, active stylus 400 reports row position information (e.g., timing, value of a row counter) over some type of wireless link (e.g., a radio transmitter). Instead of or in addition to a radio link, row position information may be transmitted electrostatically via excitation of the electrode tip 402 (or electrode eraser 404) of active stylus 400.

In some implementations, interpolation may be employed to increase positional resolution. For example, assuming a highest amplitude at row K, amplitudes may also be noted for rows K−2, K−1, K+1, K+2. Assessing the amplitudes for these neighboring rows can enable finer determinations of Y position. Essentially, active stylus 400 "listens" for a communication from rows, and based on the "loudness" of that communication, an assessment is made as to how close active stylus 400 is to the row that is "talking." By assessing communication volume from a few rows on either side of the "loudest" row, a higher position granularity may be determined.

In addition to receiving during a "sync subframe" and during a "row-drive" subframe, active stylus 400 may drive its electrode (tip or eraser) during a "stylus-drive" subframe. In this case, application of a drive signal to the stylus tip electrode influences/varies electrical conditions on one or more column electrodes of the touch-sensor matrices. The column receive circuitry correlates, as described above, in order to interpret the received signals. The column experiencing the highest signal, or an above-threshold signal, is deduced to be the column that active stylus 400 is closest to, thereby establishing the X position of active stylus 400. And as with the Y determination, the conditions at a clustered grouping of columns may be used to establish a higher positional resolution.

It will also be appreciated that signals received in the stylus-drive subframe can be used to disambiguate Y-position of active stylus 400 in a system with two or more touch-sensing matrices. During the stylus-drive subframe, active stylus 400 will only light up columns on the matrix it was near, thereby enabling the ambiguity to be resolved.

Furthermore, during the stylus-drive subframe, active stylus 400 may transmit stylus information to display device 100 via the electrostatic channel formed between an electrode (e.g., tip 402, eraser 404) of active stylus 400 and touch-sensor matrix 300. As discussed above, various operations may be performed to reduce a size of a report that includes such stylus information in order to transmit the report in an efficient and robust manner such that data transmission via the electrostatic communication channel may be reduced.

Figure 5:
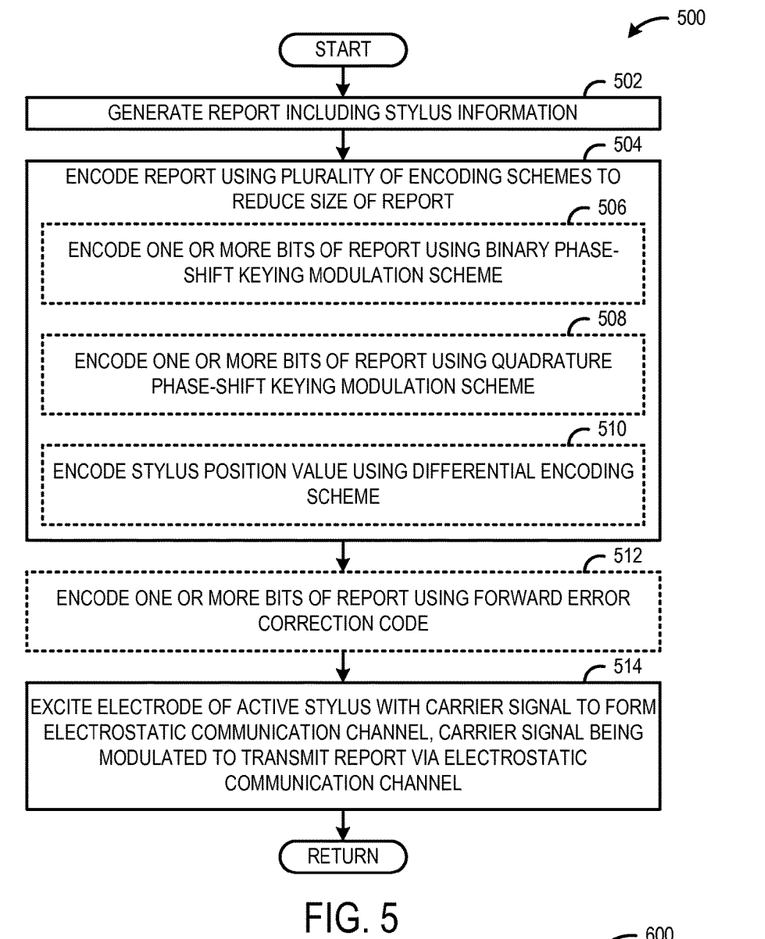
FIG. 5 shows an example method of electrostatically transmitting stylus information to a touch-sensitive display device.
Figure 13:
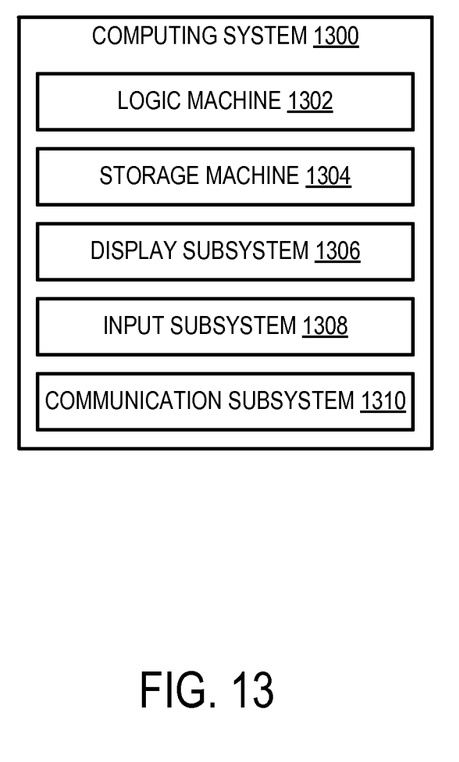
FIG. 13 shows an example computing system.

FIG. 5 shows an example method 500 of electrostatically transmitting stylus information to a touch-sensitive display device in a robust and efficient manner The method 500 may be performed by active stylus 400 of FIG. 4 and/or computing device 1300 of FIG. 13. In general, the method 500 may be performed by any suitable computing device to communicate with a touch sensor via an electrostatic communication channel.

FIGS. 6-10 show various operations that may be performed by an active stylus or other computing device in the course of performing the method 500, and will be referenced throughout discussion of the method 500.

At 502, the method includes generating a report including stylus information. The report may include any suitable information about the active stylus.

Figure 6:
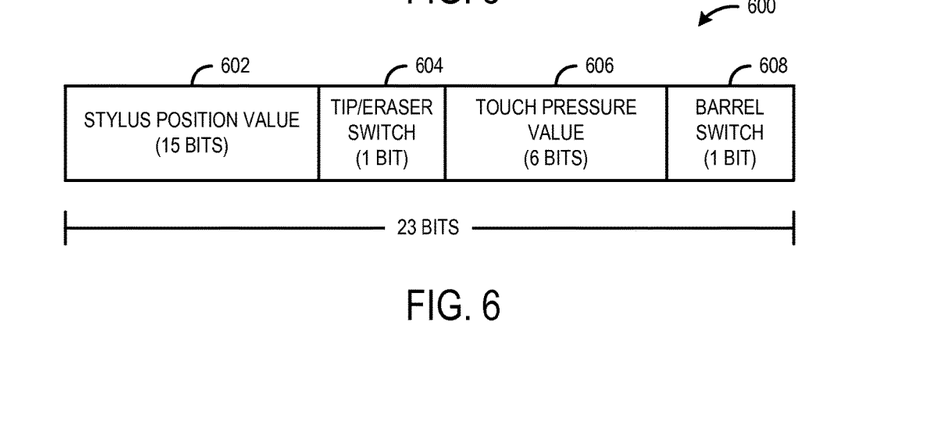
FIG. 6 shows an example bit representation of a report that includes stylus information.

FIG. 6 shows an example report 600 including stylus information in the form of different parameter values. In particular, report 600 includes a stylus position value 602, a tip/eraser switch value 604, a touch pressure value 606, and a barrel switch value 608. For example, the stylus position value 608 may be a Y-coordinate value of the active stylus relative to the display device. In one example, the Y-coordinate value is represented by 15 bits. The tip/eraser switch value 604 may indicate which electrode is "active," or in other words, has formed an electrostatic communication channel with the touch sensor. For example, the determination of which electrode is active may be based on which electrode has the greatest signal strength during the row-drive subframe. In one example, the tip/eraser switch value 604 is represented by 1 bit. For example, the value 0 may indicate that the tip is active, and the value 1 may indicate that the eraser is active. The touch pressure value 606 may indicate a touch pressure of the active electrode. For example, if the pressure value is 0, then it may be determined that the active stylus is not touching the display device. In some cases, the touch pressure value may be used to determine whether the active stylus is in a touch mode or a hover mode. In one example, the pressure value is represented by 6 bits. The barrel switch value 608 may indicate a depressed/undepressed state of the barrel switch button 416 of the active stylus 400 of FIG. 4. In one example, the barrel switch value 608 is represented by 1 bit. For example, the value 1 may indicate that the barrel switch button is depressed, and the value 0 may indicate that the barrel switch button is not depressed.

In this example, the report 600 is represented by a total of 23 bits. In other implementations, the report may include more or less bits. For example, a report for an active stylus that does not include a barrel switch button may be represented by a total of 22 bits. The report may be represented by any suitable number of bits without departing from the scope of the present disclosure. For example, various parameters may be represented with more or less bits. In one example, where a display has greater dimensions/resolution, the stylus position value may be represented by a greater number of bits. Moreover, the report may include any suitable parameters of the active stylus, and such parameters may be provided by any suitable sensors or other componentry of the active stylus. In some implementations, the report may include additional parameters. For example, such parameters may indicate additional operating states or modes of the active stylus.

Continuing with FIG. 5, at 504, the method 500 may include encoding the report using a plurality of encoding schemes to reduce a size of the report. For example, the report may be encoded into a carrier signal that is electrostatically transmitted to a display device. In some implementations, a plurality of different encoding schemes may be applied to the entire report. In some implementations, different encoding schemes may be applied to the report on a frame-by frame basis. For example, a first encoding scheme may be applied to the report in a first frame, and a second encoding scheme different than the first encoding scheme may be applied to the report in a second frame. In some implementations, different encoding schemes may be applied to different bits of the report. For example, a first encoding scheme may be applied to a first subset of bits of the report, and a second encoding scheme may be applied to a second subset of bits of the report. In some implementations, using a plurality of encoding schemes may include applying an encoding scheme to a subset of bits of the report in a first frame, and not applying the encoding scheme to the subset of bits of the report in a second frame. In some implementations, using a plurality of encoding schemes may include transmitting a subset of bits of a parameter of the active stylus as part of the report in a first frame, and not transmitting the subset of bits of the parameter of the active stylus as part of the report in a second frame. Any suitable encoding scheme may be applied to the report.

Figure 7:
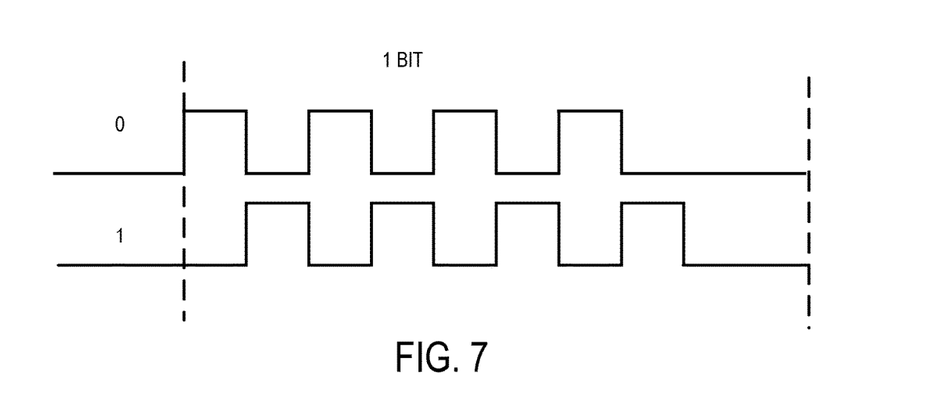
FIG. 7 shows an example binary phase-shift keying modulation scheme.

In some implementations, at 506, the method 500 optionally may include encoding one or more bits of the report using a binary phase-shift keying (BPSK) modulation scheme. FIG. 7 shows an example cycle of a carrier signal modulated according to the BPSK modulation scheme. In particular, two different phases of the waveform are separated by 180° to represent the values 0 and 1, respectively. The BPSK modulation scheme may be a robust modulation scheme, due to the large distance between the two phases that allows for a higher level of noise or distortion before an error occurs. However, due to the large distance between phases, the BPSK modulation scheme modulates the carrier signal at only 1 bit/symbol. In one example, each bit may be coded with four carrier cycles, with a guard time of approximately one carrier cycle between bits. For example, a symbol/slot time may be chosen to achieve a desired signal-to-noise-ratio.

In some implementations, the entire report may be encoded according to the BPSK modulation scheme. In some implementations, only a subset of bits may be encoded according to the BPSK modulation scheme. For example, because the BPSK modulation scheme may be more robust than other modulation encoding schemes, a subset of bits that are deemed to be prioritized or more important may be encoded according to the BPSK modulation scheme to increase a likelihood that the prioritized bits can be transmitted without error.

Figure 8:
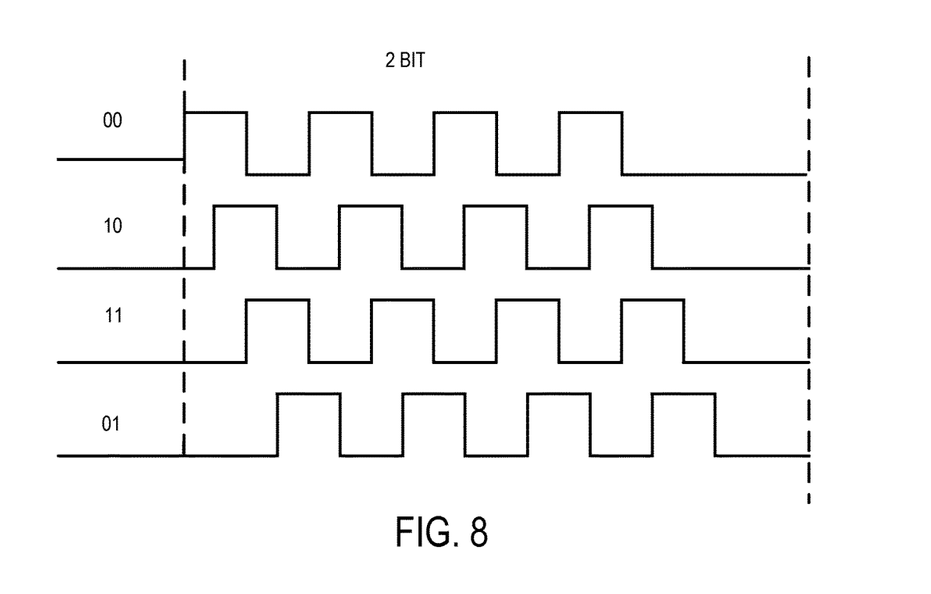
FIG. 8 shows an example quadrature phase-shift keying modulation scheme.

Continuing with FIG. 5, in some implementations, at 508, the method 500 optionally may include encoding one or more bits of the report using a quadrature phase-shift keying (QPSK) modulation scheme. FIG. 8 shows an example cycle of a carrier signal modulated according to the QPSK modulation scheme. In particular, four different phases of the waveform are separated by 90° to represent the values, 00, 01, 10, and 11, respectively. The QPSK modulation scheme may be employed to decrease the number of time slots to transmit the report bits to the display device. In particular, the QPSK modulation scheme may have a higher data rate than the BPSK modulation scheme, due to the phases of the different waveforms being spaced closer together in the QPSK modulation scheme than the BPSK modulation scheme. In particular, the QPSK modulation scheme may modulate a carrier signal at 2 bits/symbol, and each symbol may be transmitted with one of four waveforms. Thus, 2 bits can be transmitted simultaneously in one slot. As such, a number of bits encoded using the QPSK may be transmitted using less time slots (e.g., half the number of time slots) than if the same number of bits were encoded using BPSK. However, the QPSK modulation scheme may be less robust than the BPSK modulation scheme. In particular, because there is less distance between phases of adjacent waveforms in the QPSK modulation scheme, a noise or distortion tolerance may be reduced that may result in a higher likelihood of an error occurring.

In some implementations, the QPSK modulation scheme may include code used to minimize the bit error. For example, in the waveforms shown in FIG. 8 there is only 1 bit difference between any two adjacent phases/waveforms; thus whenever the signal is wrongly decoded to its adjacent waveforms, it will only cause 1 bit error, instead of 2 bit errors.

In some implementations, the entire report may be encoded according to the QPSK modulation scheme. In other examples, only a subset of bits of the report is encoded according to the QPSK modulation scheme. For example, a first subset of bits of the report that are deemed to be prioritized or more important may be encoded according to the more robust BPSK modulation scheme, and a second subset of bits of the report that are deemed less important may be encoded according to the QPSK modulation scheme. Such an approach may strike a balance between reducing a time to transmit the report to the display device, and transmitting the report in a robust manner that is less prone to errors.

In some implementations, the circuitry in the active stylus may be capable of producing an output voltage having a greater range of values. In such implementations, a larger mapping constellation modulation scheme may be employed. In some implementations, other types of modulation schemes may be employed to encode the report. For example, an amplitude scheme, such as a 4-quadrature amplitude modulation (4-QAM) scheme may be employed to encode one or more bits of the report instead of the QPSK modulation scheme. Any suitable modulation scheme may be employed to encode the report into the carrier signal without departing from the scope of the present disclosure.

Continuing with FIG. 5, in some implementations, at 510, the method 500 optionally may include encoding a stylus position value using a differential encoding scheme to reduce a number of bits of the stylus position value included in the report.

Figure 9:
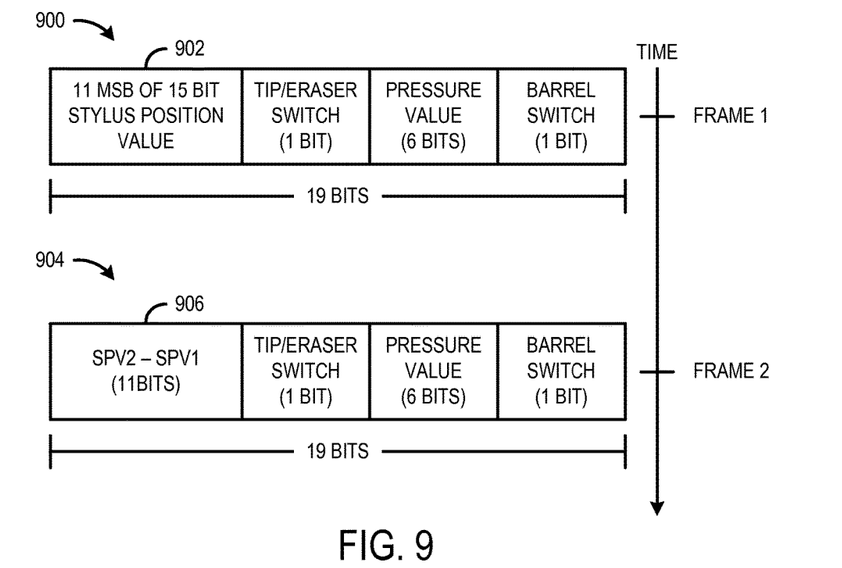
FIG. 9 shows an example differential encoding scheme that may be applied to a stylus position value.

FIG. 9 shows an example differential encoding scheme that may be used to reduce a number of bits of the stylus position value included in the report. In this example, a stylus position value (e.g., Y-coordinate) may have a full resolution of 15 bits. In order to the reduce a number of bits of the stylus position value included in the report, the differential encoding scheme may be applied to the stylus position value to represent the stylus position value as a difference between a position of the active stylus in a current frame and a position of the active stylus in a previous frame. In this case, the differential encoding reduces the number of bits that represent the stylus position value in the report from 15 to 11.

In the first frame, there is no previous frame from which to calculate a difference. Accordingly, in the first frame, the report 900 includes a stylus position value 902 that is represented as a subset of most significant bits (e.g., 11 bits) of the stylus position value at a time of the first frame. The subset of most significant bits may provide a coarse estimation of the position of the active stylus on the display for one frame. For example, the stylus position value may be defined in terms of an entire dimension (e.g., height) of the display, and the most significant bits may define different general regions of the display, whereas the least significant bits may correspond to a particular row/column. In one particular example, the most significant bits may provide a coarse estimation of position that is accurate to within 4 pixels, whereas the entire stylus position value may be accurate to within a single pixel. Since each frame is relatively short (e.g., ~8.3 ms), such coarse estimation may not be noticeable by a user when used for a single frame. Further, the position of the active stylus may be more accurately estimated in subsequent frames using a differential representation. In particular, in the second frame, the report 904 includes a stylus position value 906 that is represented as a difference of the stylus position value at the time of the first frame and the stylus position value at a time of the second frame. Further, in each subsequent frame, the stylus position value may be represented by a difference of a position of the active stylus in a current frame and a position of the active stylus in a previous frame.

The differential encoding scheme may reduce a number of bits to represent the stylus position value, because the active stylus may move a limited distance between adjacent frames. In one example, the frame period may be approximately 8.3 ms for a 120 Hz scan rate. If the active stylus moves at a maximum speed 5 m/s, the distance between 2 adjacent frames is less than 8.3 ms×5 m/s=4.2 cm. For a display with 1 meter height, which is represented by 15 bits values, 15−log 2 (1 m/4.2 cm)=11 bits is enough to represent the distance between two adjacent frames. This reduces the total bits for one report to 11+1+6+1=19 bits ((23−19)/23=17% drop in total info bits). This example is meant to be non-limiting, and the differential representation of the stylus position value may be represented by any suitable number of bits.

In some implementations, the stylus position value may be reset periodically (e.g., every 20 frames) by using the subset of most significant bits to represent the stylus position value in the report for one frame (i.e., coarse resolution). This frame may be referred to as an anchor frame. By employing the anchor frame on a repeated or cyclic basis, error propagation that may occur from differential encoding may be mitigated. In other words, a bit error may be inhibited from accumulating infinitely.

Figure 10:
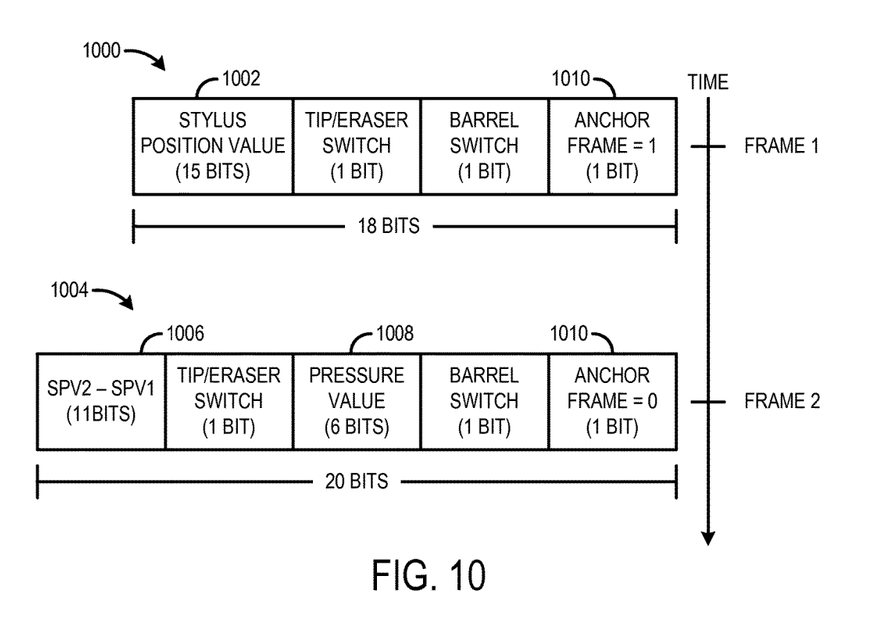
FIG. 10 shows another example differential encoding scheme that may be applied to a stylus position value.

FIG. 10 shows another example differential encoding scheme that may be used to reduce a number of bits of the stylus position value included in the report. In particular, the first frame represents an anchor frame where a report 1000 includes the stylus position value 1002 represented by the full 15 bits. Further, in the anchor frame, a touch pressure value (e.g., 6 bits) is omitted from the report 1000 to allow for the full 15 bits of the stylus position value to be included in the report 1000. In other words, the touch pressure value is omitted from the report in favor of including the least significant bits of the stylus position value.

Furthermore, the second frame represents a non-anchor frame where a report 1004 includes the stylus position value 1006 represented by the 11 bit difference between the stylus position value of the current frame and the stylus position value of the previous frame. Further, the report 1004 may include a touch pressure value 1008. In non-anchor frames, the touch pressure value 1008 may be included in the report 1004, because the stylus position value 1006 is represented using less than the full 15 bits.

In some implementations, the report may include an anchor frame indicator 1010 that indicates whether a frame is an anchor frame. The anchor frame indicator 1010 may be represented as 1 bit. In one example, if the anchor frame indicator 1010 is a 1, then the frame is an anchor frame, and if the anchor frame indicator 1010 is a 0, then the frame is a non-anchor frame. The anchor frame indicator 1010 may be used by a display device that receives the report to extract the correct parameter values from the report.

In some implementations, the active stylus may be configured to operate in a hover mode where the tip/eraser does not touch the display, but still forms an electrostatic communication channel with the touch sensor of the display device. For example, in the hover mode, the active style may be positioned a few millimeters/centimeters away from the display device. In this case, the capacitance (or signal strength) between the active stylus tip/eraser and the touch sensor will be much weaker relative to when the tip/eraser touches the display device (e.g., when the active stylus operates in touch mode). Such a weak signal may not allow the report to be electrostatically transmitted to the display device using the same time slot as would have been used when the active stylus operates in touch mode. To mitigate this issue, when the active stylus operates in hover mode, the report may be sent using a different waveform having a longer slot time and/or greater amplitude in order to increase the signal strength between the active stylus tip/eraser and the touch sensor.

However, the different waveform having the longer slot time may increase the time to transmit the bits of the report (e.g., by a factor of 2). As such, when the active stylus operates in hover mode, various stylus information may be omitted from the report in order to reduce the size of the report. In particular, when the active stylus operates in hover mode, the pressure sensor value should always be zero, thus the pressure value may be omitted from the report. Moreover, in hover mode, there may be a greater stylus position accuracy tolerance relative to when the active stylus operates in touch mode. Accordingly, when the active stylus operates in hover mode, the stylus position value may be truncated (e.g., 9 bits) in the report. These changes may cause the number of bits included in the report to be reduced to 11 bits (9 bits y coordinate+1 bit tip/eraser+1 bit barrel switch). Thus, the slot time for each bit is doubled relative to when the active stylus operates in touch mode, and the waveform having the longer slot time and greater signal strength may be used to send the report to the display device.

Moreover, in some cases, operation in the hover mode may contract a number of time slots in the stylus-drive subframe. For example, some time slots may be reassigned for position determination in a different subframe, because additional time may be required to determine the position of the active stylus due to a reduced signal strength while in hover mode. As such, by reducing the size of the report in hover mode, the bits of the report may still be transmitted in the contracted number of time slots.

In some implementations, the differential encoding may include transmitting a subset of bits of the report in a first touch-sensing frame, and not transmitting the subset of bits of the report in a second touch-sensing frame. For example, in an anchor frame, the bits representing the touch pressure value may not be transmitted in favor of transmitting both the most significant bits and the least significant bits (e.g., the full bit representation) of the stylus position value. Further, in non-anchor frames, the touch pressure value may be transmitted. In another example, the most significant bits of the stylus position value may be transmitted in the anchor frame, and the most significant bits of the stylus position value may not be transmitted in non-anchor frames in favor of the difference of the stylus position value in the current frame and the stylus position value in a previous frame. In another example, in touch mode, the touch pressure value may be transmitted, and in hover mode, the touch pressure value may not be transmitted.

In some implementations, a stylus-drive subframe may have a fixed number of time slots, and the differential encoding may include using the fixed number of time slots to transmit a first set of stylus information in a first touch-sensing frame, and using the fixed number of time slots to transmit a second set of stylus information different than the first set of stylus information in a second touch-sensing frame. For example, in an anchor frame, a first set of stylus information (e.g., MSB and LSB of stylus position value) may be transmitted, and in a non-anchor frame a second set of stylus information (e.g., stylus position value different and touch pressure value) may be transmitted. In another example, in touch mode, a first set of stylus information (e.g., greater bit representation of stylus position value and touch pressure value) may be transmitted, and in hover mode a second set of stylus information (e.g., lower bit representation of stylus position and no touch pressure value) may be transmitted.

The above described examples are meant to be non-limiting. The differential encoding scheme may include any suitable encoding that changes the stylus information to reduce a size of the report. Moreover, such changes may occur on a frame-to-frame basis.

Continuing with FIG. 5, in some implementations, at 512, the method 500 may include encoding one or more bits of the report using a forward error correction code. Any suitable forward error correction scheme may be used to encode one or more bits of the report.

In some implementations, the entire report may be encoded using a forward error correction code. In one example, a Hamming (31, 26, 3) scheme may be applied to protect against a 1 bit error. For example, an original 23 bits report may be extended to 26 bits (e.g., append 3 zeros), and the Hamming (31, 26, 3) encoding may be applied to get 31 bits of data by calculating 5 parity bits with a generator matrix. Further, the 3 appended zeros may be removed from the encoded 31 bits (no need to send 3 appended zeros, because the display device may know they are zeros). As such, the encoded 28 bits report may be transmitted to the display device. In this example, all bits are treated equally and 5 check bits are added to protect the report.

However, in some implementations among all the info bits (e.g., 23 bits), each bit may not carry the same amount of information to the display device. In other words, some bits of the report may be prioritized over other bits in the report. For example, the tip/eraser switch is very important, since if it is wrong, the digitizer may think the stylus is in opposite status. The stylus position value (e.g., Y-coordinate) has 15 bits, and the 15th bit (most significant bit (MSB)) may carry more information than the 1st bit (least significant bit (LSB)). That is, the 15th bit may indicate the stylus is on the top half of the display or the bottom half of the display; while the 1st bit may indicate that the stylus is close to an odd pixel or an even pixel.

Accordingly, in some implementations different bits of the report may be encoded differently with a layered modulation/encoding scheme. For example, the selected 11 prioritized bits (e.g., 1 tip/eraser switch bit, 6 MSB from the y coordinate, and 3 MSB from pressure sensor and the 1 barrel switch bit) may be encoded using a Hamming (15, 11) encoding and the other bits of the report may be sent as raw data. In some cases, these bits may be encoded without using the forward error correction code. In this example, 4 checking bits, instead of 5, may be appended to the report. In some implementations, the prioritized bits may be sent with a smaller constellation size (e.g., BPSK), and the other bits may be sent with a larger constellation size (e.g., 4QAM/QPSK). Since the distance between two points from BPSK constellation is larger than the one from 4QAM/QPSK constellation, BPSK may be more reliable to the noise and can provide more protection to the prioritized bits relative to 4QAM/QPSK.

At 514, the method 500 may include exciting the electrode of the active stylus with a carrier signal to form an electrostatic communication channel with the touch sensor of the display device. The carrier signal may be modulated to transmit the report via the electrostatic communication channel to the display device. The carrier signal may have any suitable waveform and may be modulated in any suitable manner in order to electrostatically transmit the report to the display device.

Figure 11:
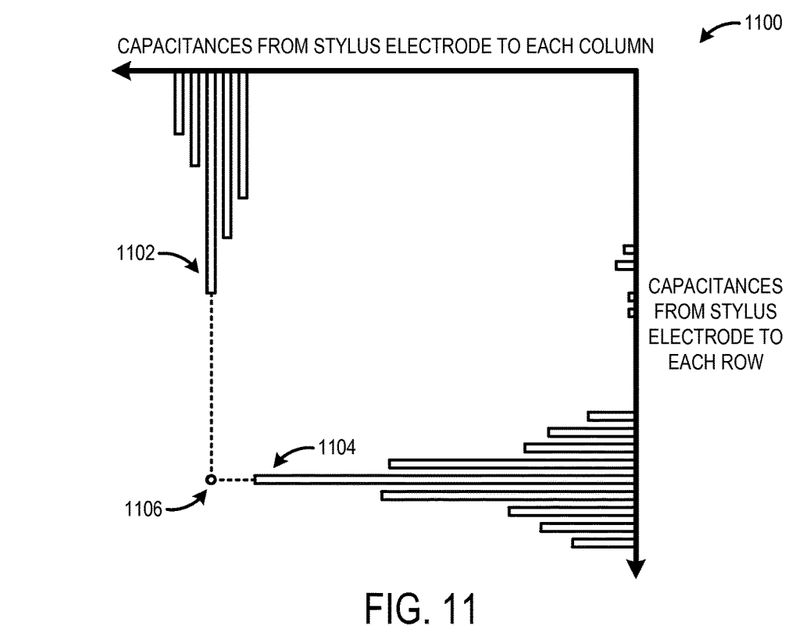
FIG. 11 shows an example visual representation of measured capacitances for the rows and columns of a touch sensor matrix.

FIG. 11 shows an example visual representation 1100 of measured capacitances for rows and columns of a touch sensor matrix. These capacitances may be used to determine a position of the active stylus relative to the touch sensor. For example, the column 1102 corresponding to the maximum measured capacitance from the stylus electrode tip to a column electrode may provide an x coordinate, and the row 1104 corresponding to the maximum measured capacitance from the stylus electrode tip to a row electrode may provide the y coordinate. The intersection 1106 of the column 1102 and the row 1104 may indicate the position of the active stylus.

Figure 12:
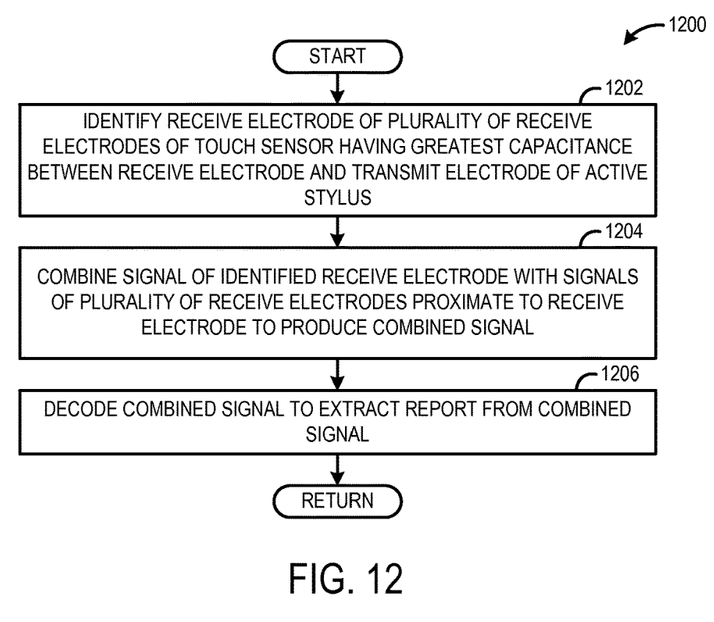
FIG. 12 shows an example method of electrostatically receiving stylus information from an active stylus.

Furthermore, the capacitances of the columns (e.g., receive electrodes) may be used to form a combined signal that may be used to decode the report in an accurate manner FIG. 12 shows an example method 1200 of electrostatically receiving stylus information from an active stylus. The method 1200 may be performed by display device 100 of FIG. 1 or computing device 1300 of FIG. 13. In general, the method 1200 may be performed by any suitable computing device to communicate with an active stylus via an electrostatic communication channel.

At 1202, the method 1200 may include identifying a receive electrode of the plurality of receive electrodes of the touch sensor of the display device having a greatest capacitance between the receive electrode and the transmit electrode of the active stylus. For example, the receive electrode may be identified during the stylus-drive subframe.

At 1204, the method 1200 may include combining a signal of the identified receive electrode with signals of a plurality of receive electrodes proximate to the receive electrode to produce a combined signal. The signals may be combined in any suitable manner. In one example, the capacitances of the plurality of proximate receive electrodes may be added to the capacitance of the identified receive electrode.

A proximate receive electrode may be within any suitable number of columns of the identified receive electrode. In one example, the plurality of receive electrodes may include receive electrodes that are within two columns of the identified receive electrode having the greatest capacitance. In some implementations, the plurality of receive electrodes may be determined based on a threshold capacitance.

At 1206, the method 1200 may include decoding the combined signal to extract the report from the combined signal.

In this approach, the proximate receive electrodes may have capacitances that are lesser than the greatest capacitance, but such capacitances may still be significantly greater than a noise level. Thus, signals corresponding to the proximate receive electrodes may contribute to accurately decoding the report. For example, the combined signal may more accurately characterize a modulation scheme that is used to decode the report than if the signal of the single identified receive electrode were decoded.

The method 1200 may be mathematically described as follows:

To decode the bit j in the report (sent by the active stylus with BPSK modulation):
1. Search the column corresponding to the maximum received signal, e.g.,
   m:abs(Rx[m])==max(abs(Rx[i])|i=1:M), where M is the number of columns in the digitizer.
2. Combine the signal from the $m^{th}$ column and its neighbors, e.g.,
   est(j)=sum(Rx[i]|i=m−k:m+k), in one example k=2.
   In this case, the effective capacitance is C=sum(C[i]|i=m−k:m+k), which is apparently bigger than the capacitance between the stylus tip and the $m^{th}$ column (C[m]).
3. Decode the transmitted bit according to est(j), for example:
   b(j)=0, if est(j)>0, otherwise 1

In some embodiments, the methods and processes described herein may be tied to a computing system of one or more computing devices. In particular, such methods and processes may be implemented as a computer-application program or service, an application-programming interface (API), a library, and/or other computer-program product.

FIG. 13 schematically shows a non-limiting implementation of a computing system 1300 that can enact one or more of the methods and processes described above. Computing system 1300 is shown in simplified form. Computing system 1300 may take the form of one or more display devices, active styluses, personal computers, server computers, tablet computers, home-entertainment computers, network computing devices, gaming devices, mobile computing devices, mobile communication devices (e.g., smart phone), and/or other computing devices.

Computing system 1300 includes a logic machine 1302 and a storage machine 1304. Computing system 1300 may optionally include a display subsystem 1306, input subsystem 1308, communication subsystem 1310, and/or other components not shown in FIG. 1300.

Logic machine 1302 includes one or more physical devices configured to execute instructions. For example, logic machine 1302 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic machine 1302 may include one or more processors configured to execute software instructions. Additionally or alternatively, Logic machine 1302 may include one or more hardware or firmware logic machines configured to execute hardware or firmware instructions. Processors of logic machine 1302 may be single-core or multi-core, and the instructions executed thereon may be configured for sequential, parallel, and/or distributed processing. Individual components of logic machine 1302 optionally may be distributed among two or more separate devices, which may be remotely located and/or configured for coordinated processing. Aspects of logic machine 1302 may be virtualized and executed by remotely accessible, networked computing devices configured in a cloud-computing configuration.

Storage machine 1304 includes one or more physical devices configured to hold instructions executable by logic machine 1302 to implement the methods and processes described herein. When such methods and processes are implemented, the state of storage machine 1304 may be transformed—e.g., to hold different data.

Storage machine 1304 may include removable and/or built-in devices. Storage machine 1304 may include optical memory (e.g., CD, DVD, HD-DVD, Blu-Ray Disc), semiconductor memory (e.g., RAM, EPROM, EEPROM), and/or magnetic memory (e.g., hard-disk drive, floppy-disk drive, tape drive, MRAM), among others. Storage machine 1304 may include volatile, nonvolatile, dynamic, static, read/write, read-only, random-access, sequential-access, location-addressable, file-addressable, and/or content-addressable devices.

It will be appreciated that storage machine 1304 includes one or more physical devices. However, aspects of the instructions described herein alternatively may be propagated by a communication medium (e.g., an electromagnetic signal, an optical signal) that is not held by a physical device for a finite duration.

Aspects of logic machine 1302 and storage machine 1304 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 1306 may be used to present a visual representation of data held by storage machine 1304. This visual representation may take the form of a graphical user interface (GUI). As the herein described methods and processes change the data held by storage machine 1304, and thus transform the state of storage machine 1304, the state of display subsystem 1306 may likewise be transformed to visually represent changes in the underlying data. Display subsystem 1306 may include one or more display devices utilizing virtually any type of technology. Such display devices may be combined with logic machine 1302 and/or storage machine 1304 in a shared enclosure, or such display devices may be peripheral display devices.

When included, input subsystem 1308 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1310 may be configured to communicatively couple computing system 1300 with one or more other computing devices. Communication subsystem 1310 may include wired and/or wireless communication devices compatible with one or more different communication protocols. As non-limiting examples, communication subsystem 1310 may be configured for communication via a wireless telephone network, or a wired or wireless local- or wide-area network. In some embodiments, communication subsystem 1310 may allow computing system 1300 to send and/or receive messages to and/or from other devices via a network such as the Internet.

In another example implementation, an active stylus comprises an electrode, and a controller. The controller is configured to 1) generate a report including stylus information represented by a plurality of bits including a first subset of bits and a second subset of bits, 2) encode the first subset of bits differently than the second subset of bits to reduce a size of the report, and 3) excite the electrode with a carrier signal to form an electrostatic communication channel, the carrier signal being modulated to transmit the report via the electrostatic communication channel. In one example implementation that optionally may be combined with any of the features described herein, the first subset of bits is encoded using a binary phase-shift keying modulation scheme and the second subset of bits is encoded using a quadrature phase-shift keying modulation scheme. In one example implementation that optionally may be combined with any of the features described herein, the first subset of bits is encoded using a forward error correction code, and the second subset of bits is encoded without using the forward error correction code. In one example implementation that optionally may be combined with any of the features described herein, the electrode is excited during a stylus-drive subframe of a touch-sensing frame of a repeated touch-sensing sequence, and the controller is configured to encode the report using a differential encoding scheme that includes transmitting a subset of bits of the report in a first touch-sensing frame, and not transmitting the subset of bits of the report in a second touch-sensing frame. In one example implementation that optionally may be combined with any of the features described herein, the electrode is excited during a stylus-drive subframe of a touch-sensing frame of a repeated touch-sensing sequence, the stylus-drive subframe has a fixed number of time slots, and the controller is configured to encode the report using a differential encoding scheme that includes using the fixed number of times slots to transmit a first set of stylus information in a first touch-sensing frame, and using the fixed number of time slots to transmit a second set of stylus information different than the first set of stylus information in a second touch-sensing frame. In one example implementation that optionally may be combined with any of the features described herein, the stylus information includes a stylus position value, and the controller is configured to encode the stylus position value using a differential encoding scheme to reduce a number of bits of the stylus position value that are transmitted. In one example implementation that optionally may be combined with any of the features described herein, the differential encoding scheme includes, in a first touch-sensing frame, transmitting a subset of most significant bits of the stylus position value, and in a second touch-sensing frame, transmitting a difference of the stylus position value at a time of the first touch-sensing frame and the stylus position value at a time of the second touch-sensing frame. In one example implementation that optionally may be combined with any of the features described herein, the stylus information further includes a touch pressure value, and the differential encoding scheme includes, in the first touch-sensing frame, transmitting a subset of least significant bits of the stylus position value at a time of the first frame, and in the second touch-sensing frame, transmitting the touch pressure value. In one example implementation that optionally may be combined with any of the features described herein, the controller is configured to, if the active stylus is operating in a touch mode, encode the report to include a first number of bits, and excite the electrode with a first carrier signal having a first amplitude to transmit the first number of bits, and if the active stylus is operating in a hover mode, encode the report to include a second number of bits that is less than the first number of bits, and excite the electrode with a second carrier signal having a second amplitude that is greater than the first amplitude. In one example implementation that optionally may be combined with any of the features described herein, the electrostatic communication channel is formed with a touch sensor of a display device, the touch sensor including a plurality of receive electrodes, and the display device is configured to 1) identify a receive electrode of the plurality of receive electrodes having a greatest capacitance between the receive electrode and the electrode of the active stylus, 2) combine a signal of the identified receive electrode with signals of a plurality of receive electrodes proximate to the receive electrode to produce a combined signal, and 3) decode the combined signal to extract the report from the combined signal.

In another example implementation, an active stylus comprises an electrode and a controller. The controller is configured to 1) generate a report including stylus information, 2) encode the report using a plurality of encoding schemes to reduce a size of the report, and 3) excite the electrode with a carrier signal to form an electrostatic communication channel, the carrier signal being modulated to transmit the report via the electrostatic communication channel. In one example implementation that optionally may be combined with any of the features described herein, the plurality of encoding schemes includes a binary phase-shift keying modulation scheme and a quadrature phase-shift keying modulation scheme. In one example implementation that optionally may be combined with any of the features described herein, the stylus information includes a stylus position value, and the plurality of encoding schemes includes a differential encoding scheme that represents the stylus position value as a difference of a position of the active stylus in a current frame and a position of the active stylus in a previous frame. In one example implementation that optionally may be combined with any of the features described herein, the electrode is excited during a stylus-drive subframe of a touch-sensing frame of a repeated touch-sensing sequence, and the controller is configured to encode the report using a differential encoding scheme that includes transmitting a subset of bits of the report in a first touch-sensing frame, and not transmitting the subset of bits of the report in a second touch-sensing frame. In one example implementation that optionally may be combined with any of the features described herein, the electrode is excited during a stylus-drive subframe of a touch-sensing frame of a repeated touch-sensing sequence, the stylus-drive subframe has a fixed number of time slots, and the controller is configured to encode the report using a differential encoding scheme that includes using the fixed number of times slots to transmit a first set of stylus information in a first touch-sensing frame, and using the fixed number of time slots to transmit a second set of stylus information different than the first set of stylus information in a second touch-sensing frame. In one example implementation that optionally may be combined with any of the features described herein, the plurality of encoding schemes includes a forward error correction encoding scheme that is applied to one or more bits of the report.

In another example implementation, a system comprises an active stylus including, a transmit electrode, and a stylus controller, and a display device including, a touch sensor including a plurality of receive electrodes, and a display controller. The stylus controller is configured to 1) generate a report including stylus information, 2) encode the report using a plurality of encoding schemes to reduce a size of the report, and 3) excite the transmit electrode with a carrier signal to form an electrostatic communication channel with one or more receive electrodes of the touch sensor of the display device, the carrier signal being modulated to transmit the report to the display device. The display controller is configured to 1) identify a receive electrode of the plurality of receive electrodes having a greatest capacitance between the receive electrode and the transmit electrode, 2) combine a signal of the identified receive electrode with signals of a plurality of receive electrodes proximate to the receive electrode to produce a combined signal, and 3) decode the combined signal to extract the report from the combined signal. In one example implementation that optionally may be combined with any of the features described herein, the plurality of encoding schemes includes at least one of a binary phase-shift keying modulation scheme and a quadrature phase-shift keying modulation scheme. In one example implementation that optionally may be combined with any of the features described herein, the stylus information includes a stylus position value, and the plurality of encoding schemes includes a differential encoding scheme that represents the stylus position value as a difference between a position of the active stylus in a current frame and a position of the active stylus in a previous frame. In one example implementation that optionally may be combined with any of the features described herein, the plurality of encoding schemes includes a forward error correction encoding scheme that is applied to one or more bits of the report.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An active stylus comprising:
an electrode; and
a controller configured to 1) generate a report including stylus information represented by a plurality of bits including a first subset of bits having a lower priority against transmission error and a second subset of bits having a higher priority against transmission error, 2) encode the first subset of bits differently than the second subset of bits, such that the first subset of bits has a higher data transmission rate than the second subset of bits to reduce a size of the report, and 3) excite the electrode with a carrier signal to form an electrostatic communication channel, the carrier signal being modulated to transmit the report via the electrostatic communication channel.

2. The active stylus of claim 1, wherein the first subset of bits is encoded using a binary phase-shift keying modulation scheme and the second subset of bits is encoded using a quadrature phase-shift keying modulation scheme.

3. The active stylus of claim 1, wherein the first subset of bits is encoded using a forward error correction code, and wherein the second subset of bits is encoded without using the forward error correction code.

4. The active stylus of claim 1, wherein the electrode is excited during a stylus-drive subframe of a touch-sensing frame of a repeated touch-sensing sequence, and wherein the controller is configured to encode the report using a differential encoding scheme that includes transmitting a subset of bits of the report in a first touch-sensing frame, and not transmitting the subset of bits of the report in a second touch-sensing frame.

5. The active stylus of claim 1, wherein the electrode is excited during a stylus-drive subframe of a touch-sensing frame of a repeated touch-sensing sequence, wherein the stylus-drive subframe has a fixed number of time slots, and wherein the controller is configured to encode the report using a differential encoding scheme that includes using the fixed number of times slots to transmit a first set of stylus information in a first touch-sensing frame, and using the fixed number of time slots to transmit a second set of stylus information different than the first set of stylus information in a second touch-sensing frame.

6. The active stylus of claim 1, wherein the stylus information includes a stylus position value, and wherein the controller is configured to encode the stylus position value using a differential encoding scheme to reduce a number of bits of the stylus position value that are transmitted.

7. The active stylus of claim 6, wherein the differential encoding scheme includes, in a first touch-sensing frame, transmitting a subset of most significant bits of the stylus position value, and in a second touch-sensing frame, transmitting a difference of the stylus position value at a time of the first touch-sensing frame and the stylus position value at a time of the second touch-sensing frame.

8. The active stylus of claim 7, wherein the stylus information further includes a touch pressure value, and wherein the differential encoding scheme includes, in the first touch-sensing frame, transmitting a subset of least significant bits of the stylus position value at a time of the first frame, and in the second touch-sensing frame, transmitting the touch pressure value.

9. The active stylus of claim 1, wherein the controller is configured to, if the active stylus is operating in a touch mode, encode the report to include a first number of bits, and excite the electrode with a first carrier signal having a first amplitude to transmit the first number of bits, and if the active stylus is operating in a hover mode, encode the report to include a second number of bits that is less than the first number of bits, and excite the electrode with a second carrier signal having a second amplitude that is greater than the first amplitude.

10. The active stylus of claim 1, wherein the electrostatic communication channel is formed with a touch sensor of a display device, the touch sensor including a plurality of receive electrodes, and wherein the display device is configured to 1) identify a receive electrode of the plurality of receive electrodes having a greatest capacitance between the receive electrode and the electrode of the active stylus, 2) combine a signal of the identified receive electrode with signals of a plurality of receive electrodes proximate to the receive electrode to produce a combined signal, and 3) decode the combined signal to extract the report from the combined signal.

11. An active stylus comprising:
an electrode; and
a controller configured to 1) generate a report including stylus information, 2) encode the report using a plurality of encoding schemes such that different portions of the report that are encoded using different encoding schemes have different data transmission rates to reduce a size of the report, where the different portions of the report have different priorities against transmission error, and where portions having higher priority against transmission error are encoded using a first encoding scheme having a first data transmission rate and portions having lower priority against transmission error are encoded using a second encoding scheme having a higher data transmission rate than the first data transmission rate, and 3) excite the electrode with a carrier signal to form an electrostatic communication channel, the carrier signal being modulated to transmit the report via the electrostatic communication channel.

12. The active stylus of claim 11, wherein the plurality of encoding schemes includes a binary phase-shift keying modulation scheme and a quadrature phase-shift keying modulation scheme.

13. The active stylus of claim 11, wherein the stylus information includes a stylus position value, and wherein the plurality of encoding schemes includes a differential encoding scheme that represents the stylus position value as a difference of a position of the active stylus in a current frame and a position of the active stylus in a previous frame.

14. The active stylus of claim 11, wherein the electrode is excited during a stylus-drive subframe of a touch-sensing frame of a repeated touch-sensing sequence, and wherein the controller is configured to encode the report using a differential encoding scheme that includes transmitting a subset of bits of the report in a first touch-sensing frame, and not transmitting the subset of bits of the report in a second touch-sensing frame.

15. The active stylus of claim 11, wherein the electrode is excited during a stylus-drive subframe of a touch-sensing frame of a repeated touch-sensing sequence, wherein the stylus-drive subframe has a fixed number of time slots, and wherein the controller is configured to encode the report using a differential encoding scheme that includes using the fixed number of times slots to transmit a first set of stylus information in a first touch-sensing frame, and using the fixed number of time slots to transmit a second set of stylus information different than the first set of stylus information in a second touch-sensing frame.

16. The active stylus of claim 11, wherein the plurality of encoding schemes includes a forward error correction encoding scheme that is applied to one or more bits of the report.

17. A system comprising:
an active stylus including, a transmit electrode, and a stylus controller; and
a display device including, a touch sensor including a plurality of receive electrodes, and a display controller,
wherein the stylus controller is configured to 1) generate a report including stylus information, 2) encode the report using a plurality of encoding schemes such that different portions of the report that are encoded using different encoding schemes have different data transmission rates to reduce a size of the report, where the different portions of the report have different priorities against transmission error, and where portions having higher priority against transmission error are encoded using a first encoding scheme having a first data transmission rate and portions having lower priority against transmission error are encoded using a second encoding scheme having a higher data transmission rate than the first data transmission rate, and 3) excite the transmit electrode with a carrier signal to form an electrostatic communication channel with one or more receive electrodes of the touch sensor of the display device, the carrier signal being modulated to transmit the report to the display device, and
wherein the display controller is configured to 1) identify a receive electrode of the plurality of receive electrodes having a greatest capacitance between the receive electrode and the transmit electrode, 2) combine a signal of the identified receive electrode with signals of a plurality of receive electrodes proximate to the receive electrode to produce a combined signal, and 3) decode the combined signal to extract the report from the combined signal.

18. The system of claim 17, wherein the plurality of encoding schemes includes at least one of a binary phase-shift keying modulation scheme and a quadrature phase-shift keying modulation scheme.

19. The system of claim 17, wherein the stylus information includes a stylus position value, and wherein the plurality of encoding schemes includes a differential encoding scheme that represents the stylus position value as a difference between a position of the active stylus in a current frame and a position of the active stylus in a previous frame.

20. The system of claim 17, wherein the plurality of encoding schemes includes a forward error correction encoding scheme that is applied to one or more bits of the report.

* * * * *